United States Patent
Nguyen et al.

(10) Patent No.: US 10,904,059 B2
(45) Date of Patent: Jan. 26, 2021

(54) CONTROL CHANNEL FOR VEHICLE-TO-EVERYTHING (V2X) COMMUNICATION

(71) Applicant: QUALCOMM INCORPORATED, San Diego, CA (US)

(72) Inventors: Tien Viet Nguyen, Bridgewater, NJ (US); Sudhir Kumar Baghel, Hillsborough, NJ (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 133 days.

(21) Appl. No.: 16/178,995

(22) Filed: Nov. 2, 2018

(65) Prior Publication Data
US 2020/0145270 A1    May 7, 2020

(51) Int. Cl.
*H04L 27/26* (2006.01)
*H04W 4/40* (2018.01)
*H04L 5/00* (2006.01)

(52) U.S. Cl.
CPC ........ *H04L 27/2613* (2013.01); *H04L 5/0023* (2013.01); *H04L 5/0048* (2013.01); *H04L 27/2607* (2013.01); *H04W 4/40* (2018.02)

(58) Field of Classification Search
CPC . H04L 27/2613; H04L 5/0023; H04L 5/0048; H04L 27/2607; H04W 4/40
See application file for complete search history.

(56) References Cited

U.S. PATENT DOCUMENTS

| | | | |
|---|---|---|---|
| 2005/0286474 A1* | 12/2005 | van Zelst | H04L 27/261 370/334 |
| 2006/0270364 A1* | 11/2006 | Aoki | H04B 7/04 455/101 |
| 2015/0146647 A1* | 5/2015 | Chatterjee | H04L 5/14 370/329 |
| 2019/0273592 A1* | 9/2019 | Baghel | H04L 1/0079 |
| 2020/0007297 A1* | 1/2020 | Hong | H04L 5/0053 |

FOREIGN PATENT DOCUMENTS

| | | |
|---|---|---|
| WO | 2015080853 A1 | 6/2015 |
| WO | 2018174677 A1 | 9/2018 |

OTHER PUBLICATIONS

International Search Report and Written Opinion—PCT/US2019/051739—ISA/EPO—dated Dec. 4, 2019.

(Continued)

*Primary Examiner* — Ajay Cattungal
(74) *Attorney, Agent, or Firm* — Smith Tempel Blaha LLC

(57) ABSTRACT

A method for communication includes generating a control channel comprising a first symbol and a second symbol, the first symbol comprising a first symbol half and a second symbol half, the first symbol half of the first symbol comprising information relating to automatic gain control (AGC) training, the second symbol half of the first symbol comprising a cyclic shifted copy of a request symbol corresponding to a length of a transmission, and the second symbol comprising control content.

20 Claims, 16 Drawing Sheets

(56) References Cited

OTHER PUBLICATIONS

Qualcomm Incorporated: "On UL Diversity Transmission scheme", 3GPP TSG RAN WG1 Meeting NR#3, 3GPP Draft; R1-1716730 on UL Diversity Transmission Scheme, 3rd Generation Partnership Project (3GPP), Mobile Competence Centre ; 650, Route Deslucioles ; F-06921 Sophia-Antipolis Cedex; France .vol. Ran WGI, no. Nagoya, Japan; Sep. 18-Sep. 21, 2017, Sep. 18, 2017 (Sep. 18, 2017), pp. 1-20, XP051353819, Retrieved from the Internet: URL:http://www.3gpp.org/ftp/tsgran/WG1_RL1/TSGR1_AH/NRAH_1709/Docs/ (retrieved on Sep. 18, 2017), paragraph [02.2], paragraph [05.1]—paragraph [05.02].

\* cited by examiner

CONTROL CHANNEL FOR VEHICLE-TO-EVERYTHING (V2X) COMMUNICATION

TECHNICAL FIELD

The present disclosure relates to wireless communication systems, and more particularly to a communication control channel for efficiently establishing high quality of service (QoS) vehicle-to-vehicle communications. Certain embodiments enable and provide an efficient communication control channel for providing efficient vehicle-to-vehicle communications.

INTRODUCTION

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, or may be any other connected device.

When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). Vehicle-to-everything (V2X) communications and particularly, V2V communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments can include generating a control channel comprising a first symbol and a second symbol, the first symbol comprising a first symbol half and a second symbol half, the first symbol half of the first symbol comprising information relating to automatic gain control (AGC) training, the second symbol half of the first symbol comprising a cyclic shifted copy of a request symbol corresponding to a length of a transmission, and the second symbol comprising control content.

Another aspect of the disclosure provides a wireless communication apparatus having a processor configured to generate a control channel for communication including a control channel comprising a first symbol and a second symbol, the first symbol comprising a first symbol half and a second symbol half, the first symbol half of the first symbol comprising information relating to automatic gain control (AGC) training, the second symbol half of the first symbol comprising a cyclic shifted copy of a request symbol corresponding to a length of a transmission, and the second symbol comprising control content.

Another aspect of the disclosure provides a device including means for transmitting a request (RRQ) symbol, means for receiving a response (RSP) symbol in response to the RRQ symbol, means for cyclic shifting a portion of a control channel, the cyclic shifted portion of the control channel comprising a copy of the request symbol corresponding to a length of a transmission, and means for transmitting the control channel including the cyclic shifted copy of the request symbol.

Another aspect of the disclosure provides a non-transitory computer-readable medium storing computer executable code for communication, the code executable by a processor to generate a control channel comprising a first symbol and a second symbol, the first symbol comprising a first symbol half and a second symbol half, the first symbol half of the first symbol comprising information relating to automatic gain control (AGC) training, the second symbol half of the first symbol comprising a cyclic shifted copy of a request symbol corresponding to a length of a transmission, and the second symbol comprising control content.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
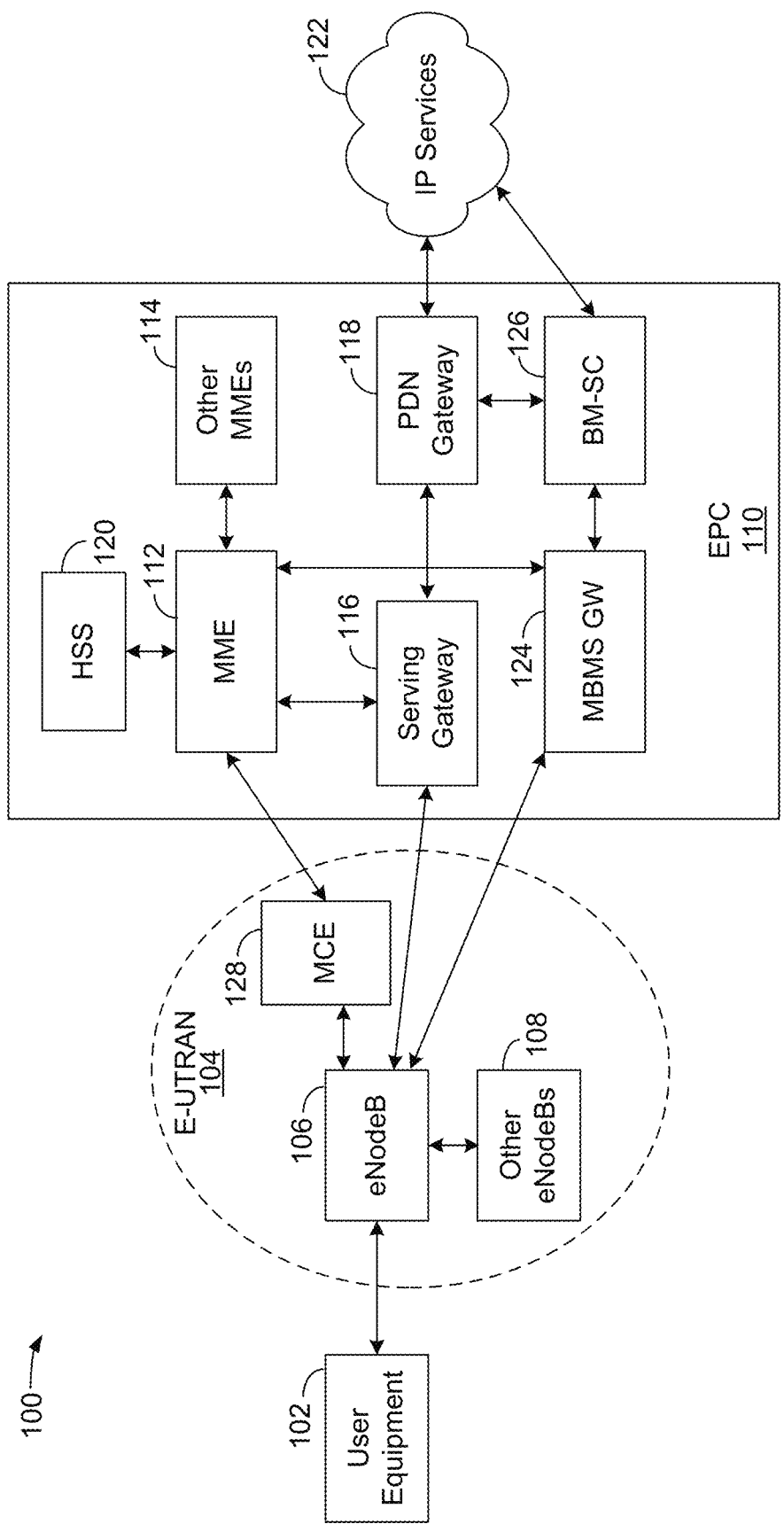
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

One of the challenges of establishing a direct communication link between and among vehicles is the establishment of a control channel so that one or more vehicles may directly communicate. Therefore, it is desirable to establish an efficient control channel for V2X communication, and for other communication.

Exemplary embodiments of the disclosure are directed to device-to-device (D2D) and, more particularly, vehicle-to-everything (V2X) communication in which a communication channel can be established that supports a high quality of service to support communications (High QoS), particularly in vehicle-to-vehicle and vehicle-to-everything communications.

As used herein, the term "NR" refers to "new radio" which is a way of referring to a radio interface that may be part of the 5G communication methodology. The term "NR" can be used interchangeably with the term "5G."

The communication traffic generated by self-driving vehicle sensors has the following characteristics. This communication traffic is generally bursty in nature, based mainly on a request for the sensor feed, it is generally variable in size depending upon number of detected objects (or deltas), it may not be able to fit a complete transmission in one communication subframe, even in high density situations, not all vehicles necessarily transmit, and it generally dictates higher reliability and low latency communication links. To make medium access more efficient than random access, some form of listen before transmit (LBT) communication methodology may be used. The term "LBT" refers to a communication methodology in which a communication device receives a transmission that may include communication channel parameters, control information, etc., before it transmits a communication message, hence, the communication device listens to determine whether there is an ongoing transmission that may interfere with a subsequent transmission before it transmits another communication message. Exemplary embodiments of the present disclosure are directed to an efficient control channel communication that can be used to establish a V2X communication.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services.

The E-UTRAN 104 includes a base station, such as, for example the evolved Node B (eNB) 106 and other eNBs 108, which may include a gNodeB (gNB) a Home NodeB, a Home eNodeB, or a base station using some other suitable terminology. For example, in a 5G or New Radio (NR) network, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, drone, vehicle, industrial equipment, medical equipment, wearable, entertainment device, recreational device, mammal implantable device, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
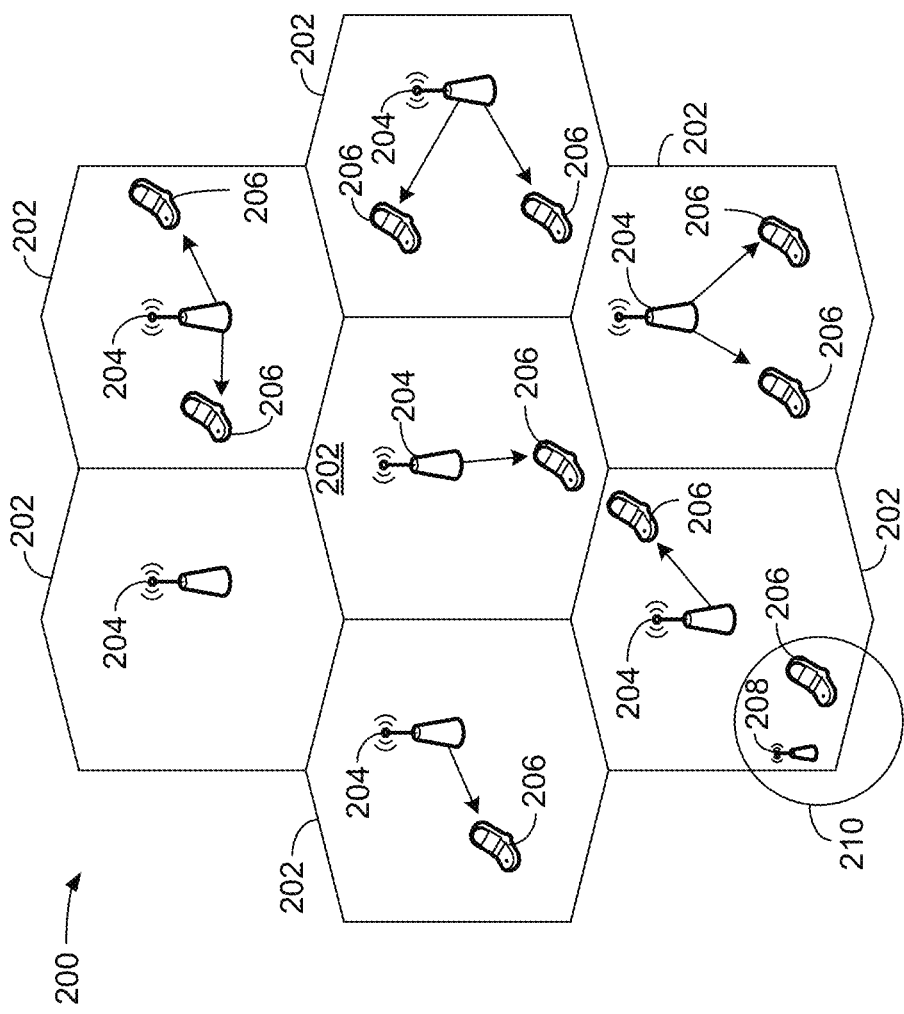
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-PDMA in the form of a DFT-spread OFDM signal to compensate for high peak-to-average power ratio (PAPR).

Figure 3:
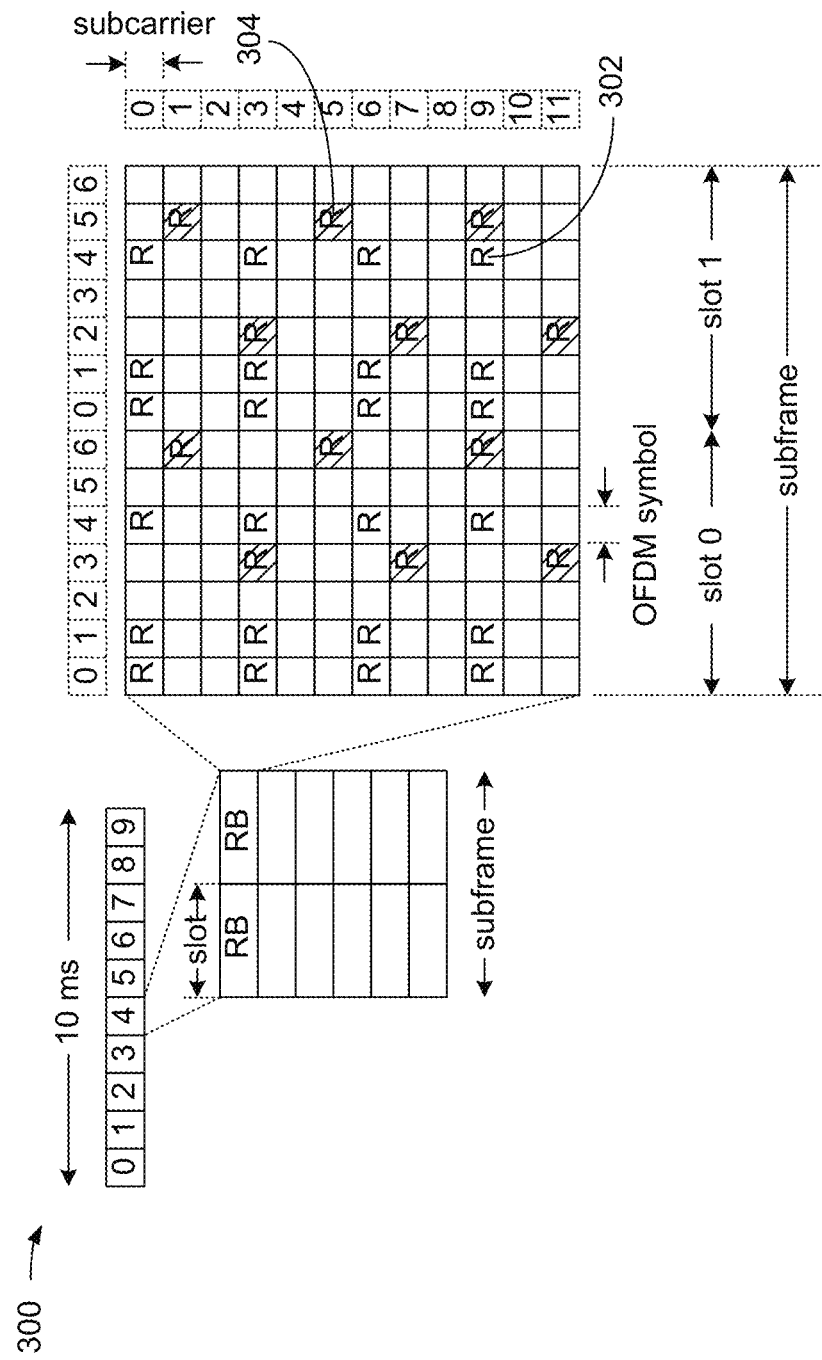
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
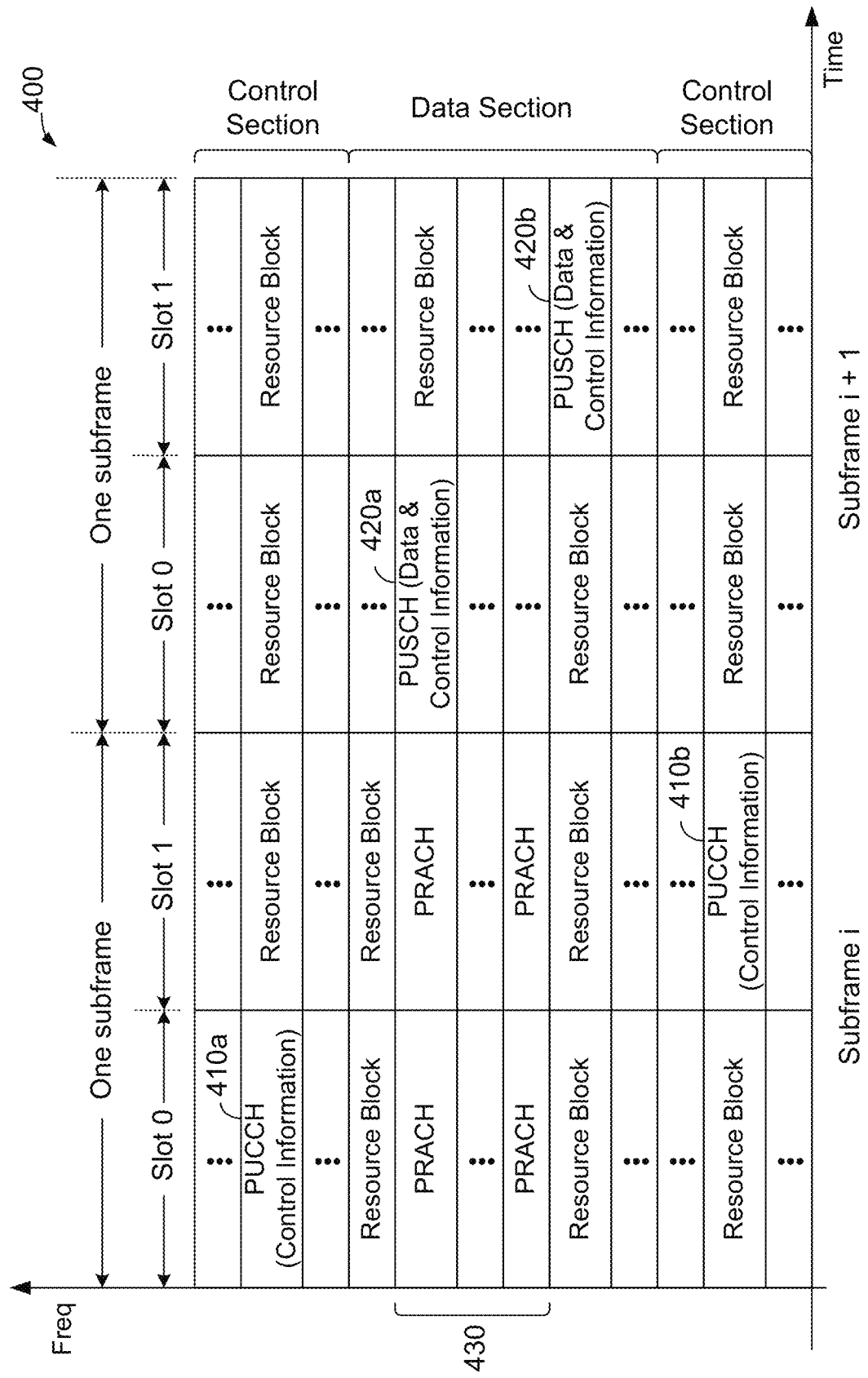
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
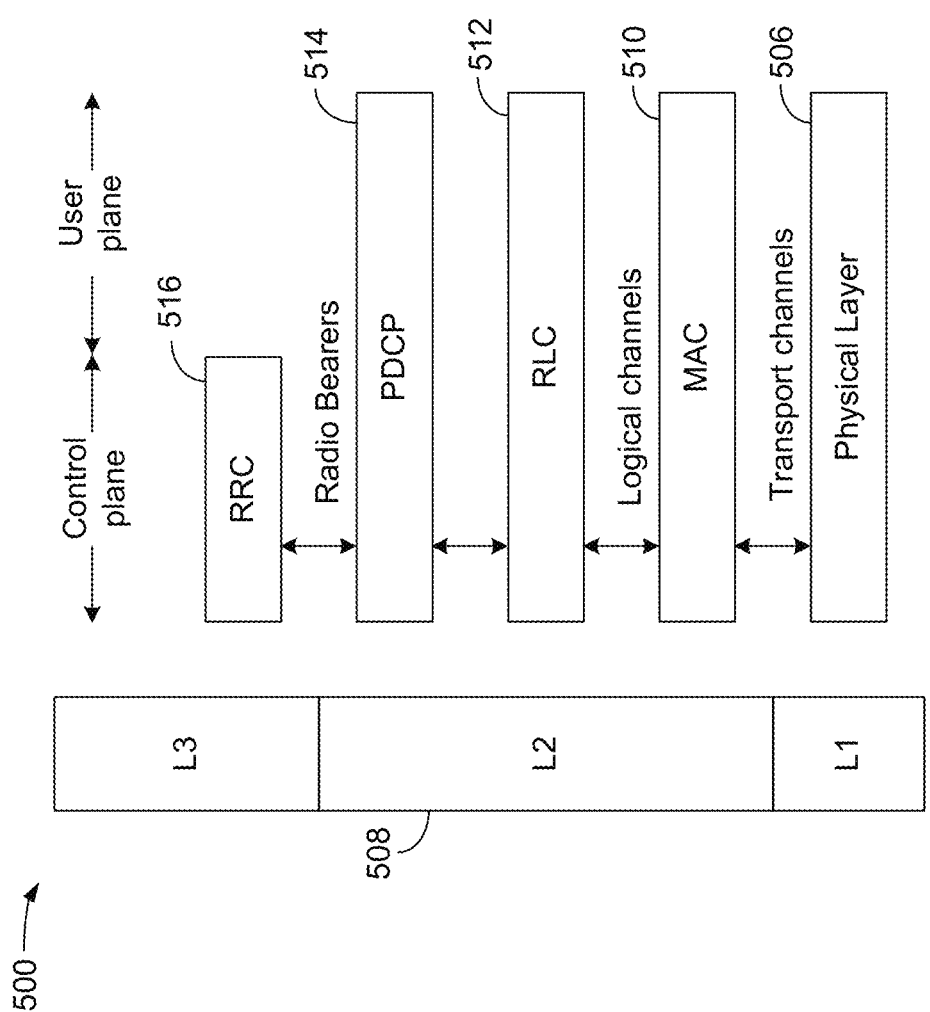
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
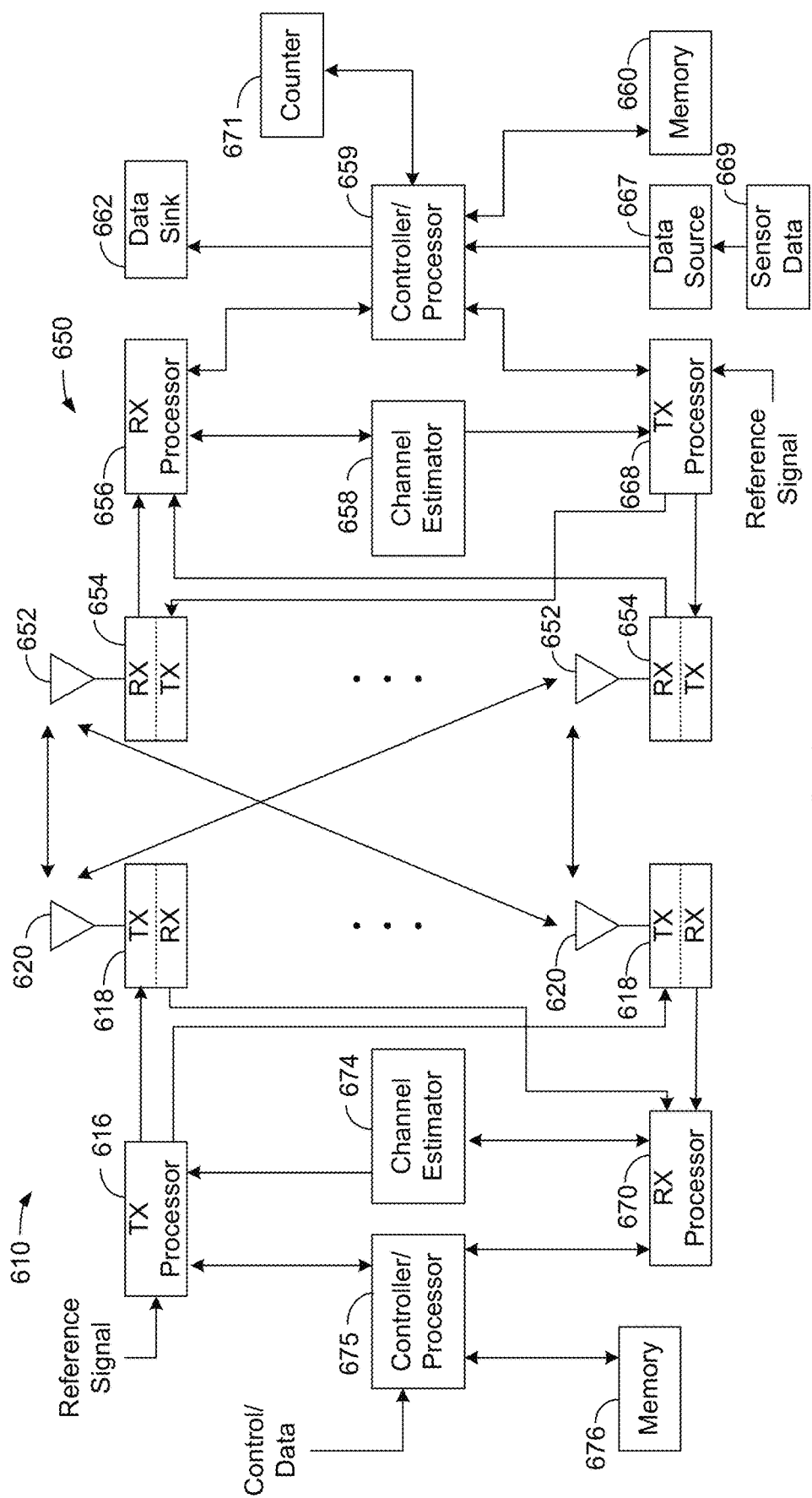
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

In an exemplary embodiment, a sensor data element 669 may provide one or more sensor data to the data source 667. For example, the sensor data element 669 may aggregate, or comprise, one or more of light detection and ranging (LIDAR) sensor data, radio detection and ranging (RADAR) sensor data, camera data, or other sensor data.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an exemplary embodiment, the controller/processor 659 may generate, enable, create, or otherwise have access to a counter 671. In an exemplary embodiment, the counter 671 may be configured to count communication symbols.

Figure 7:
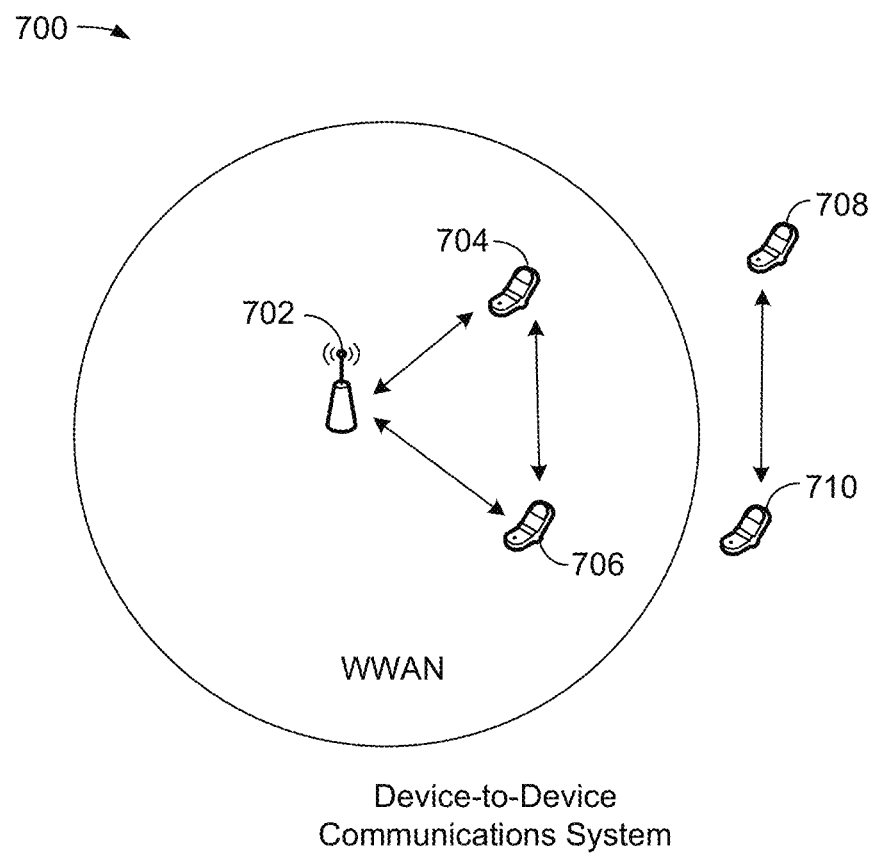
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system (as shown and described in FIG. 1 and FIG. 2), such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. Yet one of ordinary skill in the art would understand that the exemplary methods and apparatuses are applicable more generally to a variety of other wireless device-to-device communication systems or communication networks such as 5G and beyond.

In wireless networks, such as an LTE network, or a NR (5G) network, some UEs may know their location while other UEs may not. In an exemplary embodiment, UEs that know their location may determine their location using global positioning system (GPS) technology. In another exemplary embodiment, UEs may have a fixed location that is preconfigured. UEs that do not know their location may lack GPS or may be in an indoor environment. In some instances, UEs that do not know their location may determine their position or location using signals received from a base station. Positioning and locating using base station signaling; however, may be inaccurate because the distance from the base station to the UE may be difficult to estimate accurately due to a lack of a direct path (e.g., non-line-of-sight) between the base station and the UE. As such, the error in estimation may be significant (e.g., 50 meters or more).

In an exemplary embodiment, a UE that does not know its location may determine its location from UEs that know their location using D2D positioning. D2D positioning through D2D signaling may be performed using device-to-device ranging, including, for example, techniques such as time of arrival (TOA) or time difference of arrival (TDOA). A UE may determine its position using TOA/TDOA and the known positions of proximate UEs.

Figure 8:
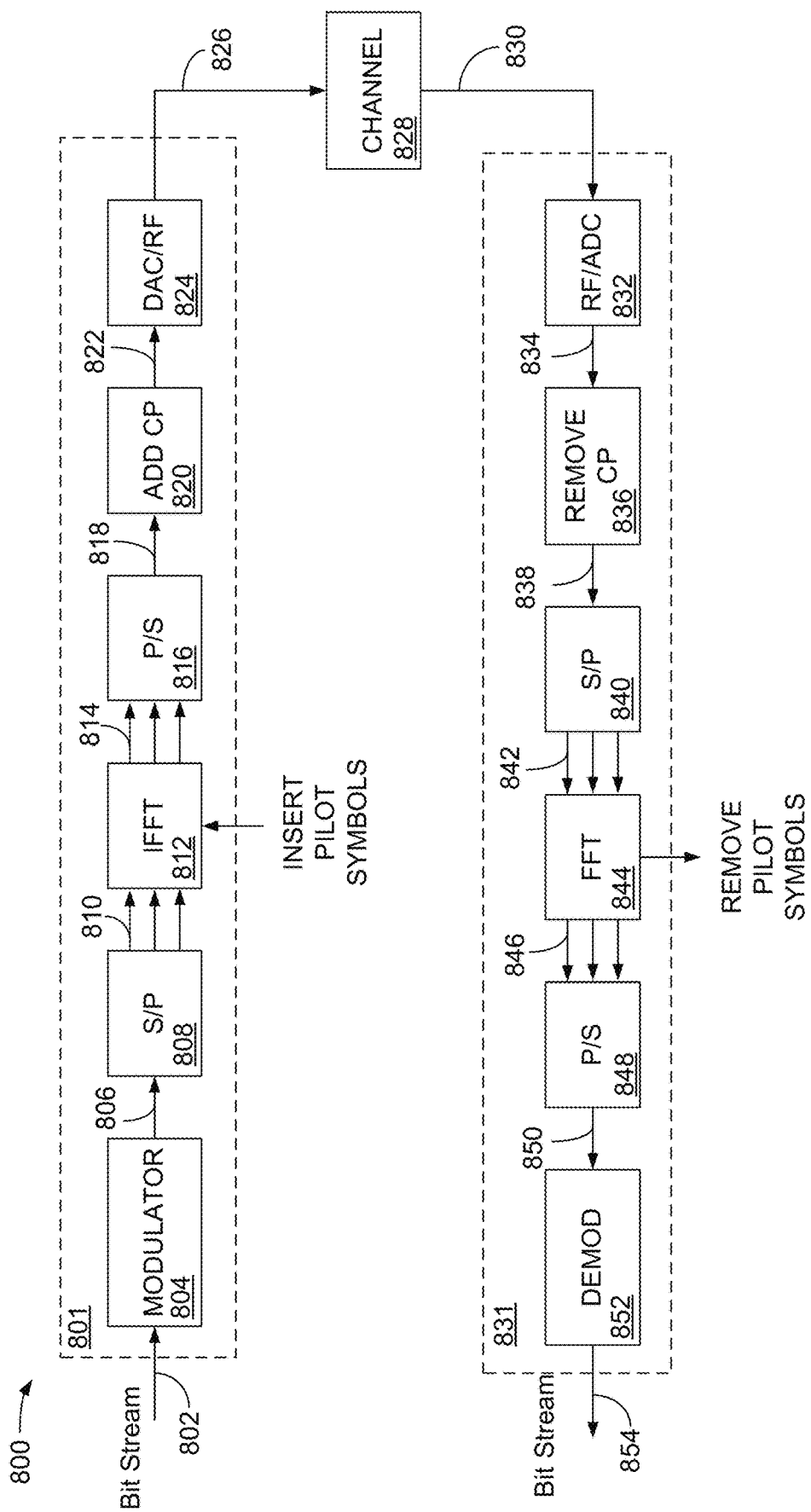
FIG. 8 is a block diagram showing an exemplary embodiment of an orthogonal frequency division multiplexing (OFDM) transmission system.

FIG. 8 is a block diagram showing an exemplary embodiment of an orthogonal frequency division multiplexing (OFDM) transmission system. The OFDM transmission system 800 may comprise a transmitter 801 and a receiver 831. The OFDM transmission system 800 may be at least partially implemented in, or may comprise a portion of a UE 102 (FIG. 1), a UE 650 (FIG. 6), or a base station 106 of FIG. 1. The OFDM transmission system 800 may also comprise part of one or more components or elements of the wireless devices 704, 706, 708 and 710 of FIG. 7.

In an exemplary embodiment, an information signal, which may be embodied in a bit stream, may be provided over connection 802 to a modulator 804. The modulator 804 may encode the bits in the bit stream to provide a modulated signal on connection 806. Examples of the modulation may include, pulse amplitude modulation (PAM), shift-keying modulation (SK), quadrature amplitude modulation (QAM), and other types of modulation.

The modulated signal on connection 806 is provided to a serial-to-parallel (S/P) converter 808, which creates a parallel output on connection 810. The parallel output on connection 810 is provided to an inverse fast Fourier transform (IFFT) function 812. The IFFT function 812 processes the parallel signals on connection 810 to form a series of OFDM symbols. Pilot symbols may also be added during the IFFT function.

The OFDM symbols are provided in parallel over connection 814 to a parallel-to-serial (P/S) converter 816, which provides the OFDM symbols on a serial channel 818. A cyclic prefix (CP), or cyclic shift, may be added to the OFDM symbols by a CP element 820. The CP coded OFDM symbols are then provided to a digital-to-analog (DAC) and a radio frequency (RF) element 824. Although shown as a single element for convenience, the DAC/RF element 824 may be embodied as separate elements. The DAC/RF element 824 converts the OFDM symbols on connection 822 to the analog domain for radio frequency processing and amplification for transmission over a channel 828. In an exemplary embodiment, the channel 828 may include one or more wired connection, one or more wireless connections, or a combination of wired and wireless connections.

A signal is received by the receiver 831 and processed in an RF/ADC (analog-to-digital converter) 832. Although shown as a single element for convenience, the RF/ADC element 832 may be embodied as separate elements. The RF/ADC element 832 receives and downconverts the received signal, and then converts the received signal to the digital domain for further processing.

The digital signal is provided over connection 834 to a CP removal element 836, which removes the cyclic prefix from the OFDM symbols. The OFDM symbols are then provided to a S/P converter 840, which creates a parallel output on connection 842. The parallel output on connection 842 is provided to fast Fourier transform (FFT) function 844. The FFT function 844 processes the parallel signals on connection 842 to recover the information that was coded into the OFDM symbols by the IFFT element 812. Pilot symbols may also be removed during the FFT function.

The output of the FFT function 844 is provided to a P/S converter 848, which provides the OFDM symbols on a serial channel 850 to a demodulator 852. The demodulator 852 may decode the information on connection 850 and provide the decoded bit stream on connection 854. Ideally, the bit stream on connection 854 is an accurate representation of the bit stream on connection 802.

Figure 9:
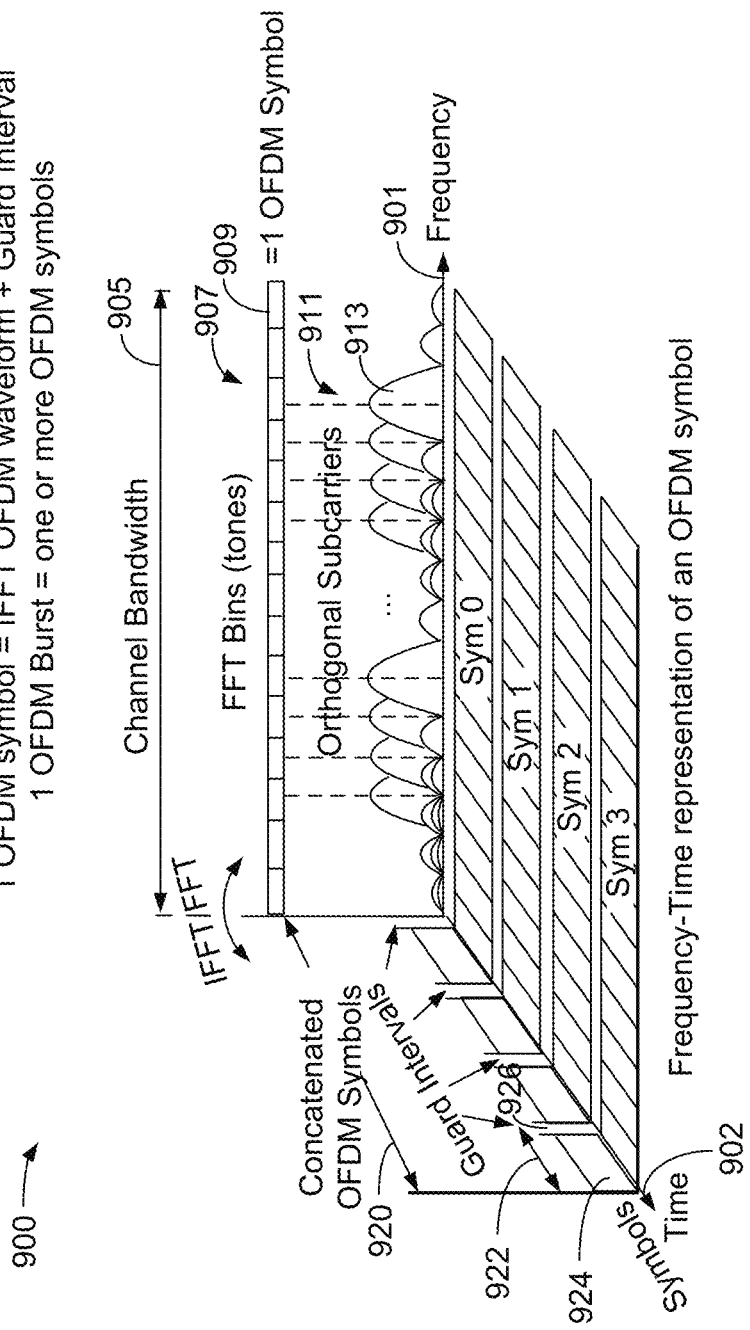
FIG. 9 is a graph showing a time-frequency representation of an orthogonal frequency division multiplexing (OFDM) symbol.

FIG. 9 is a graph 900 showing a time-frequency representation of an orthogonal frequency division multiplexing (OFDM) symbol. The graph 900 includes a frequency axis 901 and a time axis 902. The frequency axis 901 shows an exemplary channel bandwidth 905 that includes a number of frequency bins, also referred to as tones 907, with an exemplary tone shown using reference numeral 909. Also shown on the frequency axis 901 are a number of orthogonal subcarriers 911, with an exemplary subcarrier shown using reference numeral 913.

The time axis 902 shows concatenated OFDM symbols 920, with an exemplary OFDM symbol shown using reference numeral 922. The exemplary OFDM symbol 922 comprises an IFFT OFDM waveform 924 and a guard interval 926. In an exemplary embodiment, four OFDM symbols (sym 0, sym 1, sym 2 and sym 3) are shown in FIG. 9.

One modulated subcarrier 911 comprises one (1) point in frequency and time. An inverse Fast Fourier Transform (IFFT) operation generates an OFDM waveform (924) from a collection of OFDM subcarriers in the same duration (913). One (1) OFDM symbol 922 equals an IFFT waveform (924) and a guard interval (926). One (1) OFDM burst may equal one or more OFDM symbols.

Figure 10:
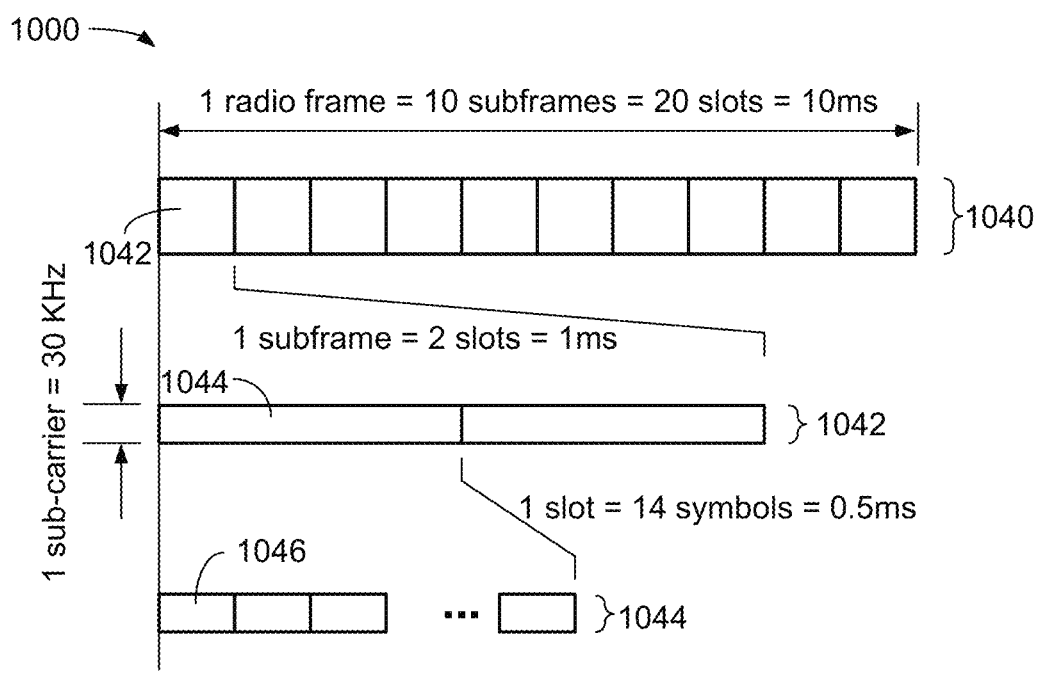
FIG. 10 is a diagram showing a 5G communication frame structure with 30 KHz sub-carrier spacing.

FIG. 10 is a diagram showing a 5G communication frame structure 1000 with 30 KHz sub-carrier spacing. The frame structure 1000 shows a 30 KHz sub-carrier spacing (SCS) and shows one (1) radio frame 1040 having ten (10) sub-frames 1042, which equates to 20 slots and a time duration of 10 milliseconds (ms). Each subframe 1042 may comprise two (2) slots 1044 and have a duration of 1 ms. Each slot 1044 may comprise 14 communication symbols 1046 having a duration of 0.5 ms, with each symbol having a duration of approximately 35 microseconds ($\mu$s). Other sub-carrier spacing leads to other communication symbol lengths.

Figure 11:
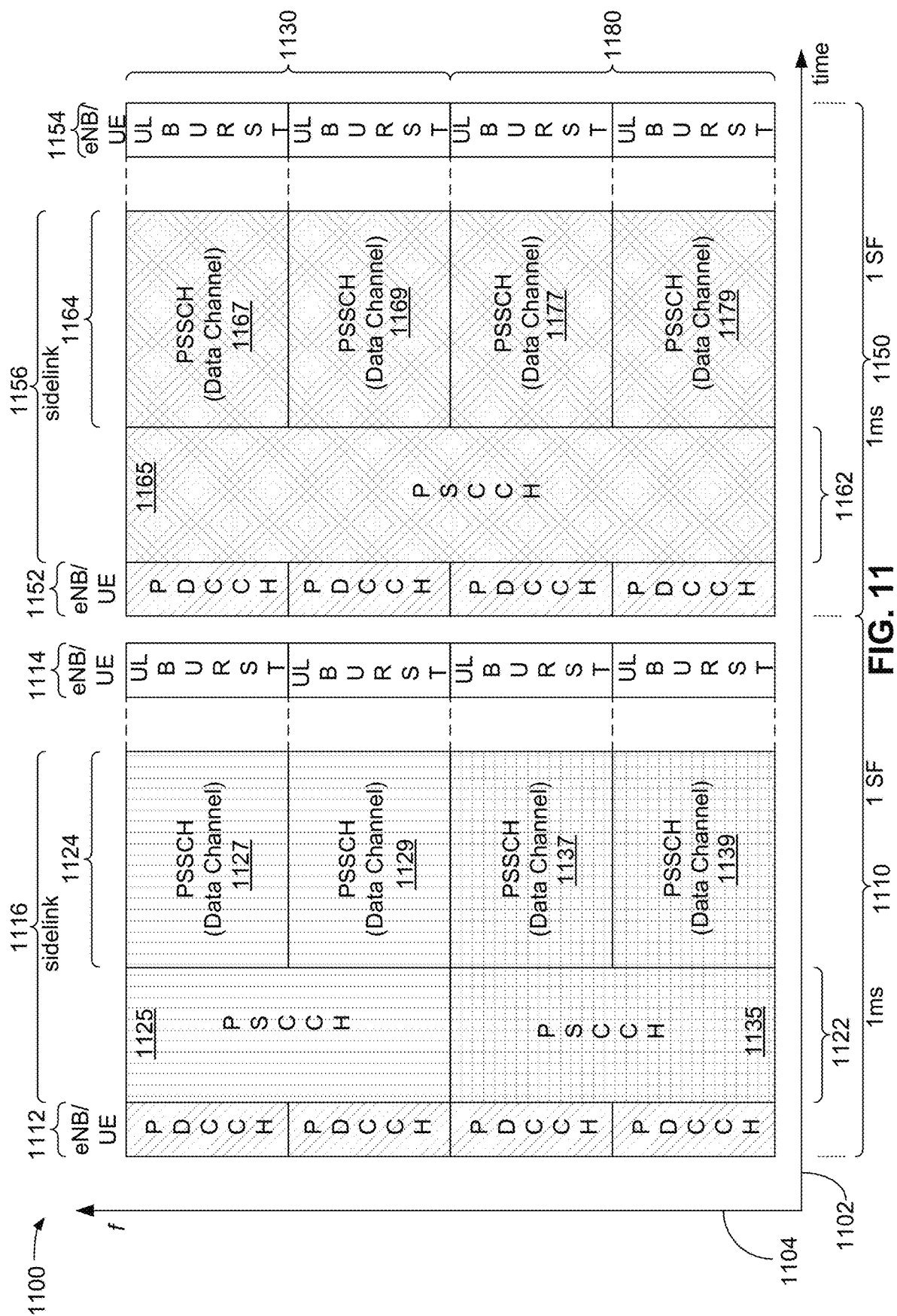
FIG. 11 is a diagram illustrating an example of a communication frame structure, in accordance with various aspects of the present disclosure.

FIG. 11 is a diagram illustrating an example of a communication frame structure 1100, in accordance with various aspects of the present disclosure. In an exemplary embodiment, the communication frame structure 1100 comprises a subframe 1110 and a subframe 1150. However, it should be understood that two subframes are shown for convenience only. Typically, many more subframes will be part of a communication frame structure.

The subframe 1110 and the subframe 1150 generally comprise a period of time and a set of frequencies that define a number of different resources, sometimes referred to as resource blocks, or radio resources.

In an exemplary embodiment, the subframe 1110 and the subframe 1150 may each occur over a time period of 1 millisecond (ms). However, the duration of a subframe is dependent upon a number of different parameters, and may be shorter or longer, depending on implementation. In an exemplary embodiment, the subframe 1110 and the subframe 1150 may be divided into what can be referred to as "sub channels." For example, certain frequency portions of the subframe 1110 and the subframe 1150 may comprise a sub-channel 1130 and certain frequency portions of the subframe 1110 and the subframe 1150 may comprise a sub-channel 1180. The sub-channels 1130 and 1180 are shown for illustrative purposes only as occupying one half of the frequency resources of the frame structure 1100. The sub-channels 1130 and 1180 are optional, and, if present, may occupy more of less of the frequency resources shown. Further, more than two sub-channels may occupy the frequency resources shown.

In an exemplary embodiment, the subframe 1110 may comprise a number of different communication channels that occupy a number of resources, both in time and in frequency. Time is shown on the horizontal axis 1102 increasing to the right and frequency is shown on the vertical axis 1104 increasing upward.

In an exemplary embodiment, the subframe 1110 may comprise a 5G physical downlink control channel (PDCCH) 1112 and an uplink channel 1114. In an exemplary embodiment, the PDCCH 1112 and the uplink channel 1114 are used for communication between a UE and a base station (eNB).

In an exemplary embodiment, the subframe 1110 may also comprise a number of radio resources that can be used for direct vehicle to vehicle (V2V) communication. These resources are generally referred to as "sidelink" resources and may be used to communicate over a "sidelink channel", and are generally referred to using the reference numeral 1116. The sidelink channel 1116 may comprise a number of radio resources including, for example, a physical sidelink control channel (PSCCH) 1122, and a physical sidelink shared channel (PSSCH) 1124. The PSCCH 1122 is a control channel over which control information is communicated and the PSSCH 1124 is a data channel over which data is communicated.

Similarly, in an exemplary embodiment, the subframe 1150 may comprise a 5G physical downlink control channel (PDCCH) 1152 and an uplink channel 1154. In an exemplary embodiment, the PDCCH 1152 and the uplink channel 1154 are used for communication between a UE and a base station (eNB).

In an exemplary embodiment, the subframe 1150 may also comprise a number of sidelink radio resources that can be used for direct vehicle to vehicle (V2V) communication. These "sidelink" resources are generally referred to using the reference numeral 1156. The sidelink channel 1156 may comprise a number of radio resources including, for example, a physical sidelink control channel (PSCCH) 1162, and a physical sidelink shared channel (PSSCH) 1164. The PSCCH 1162 is a control channel over which control information, such as Sidelink Control Information (SCI) messages, are communicated and the PSSCH 1164 is a data channel over which data is communicated. For example the above-mentioned V2X communications may be communicated over the PSSCH 1164.

Figure 12:
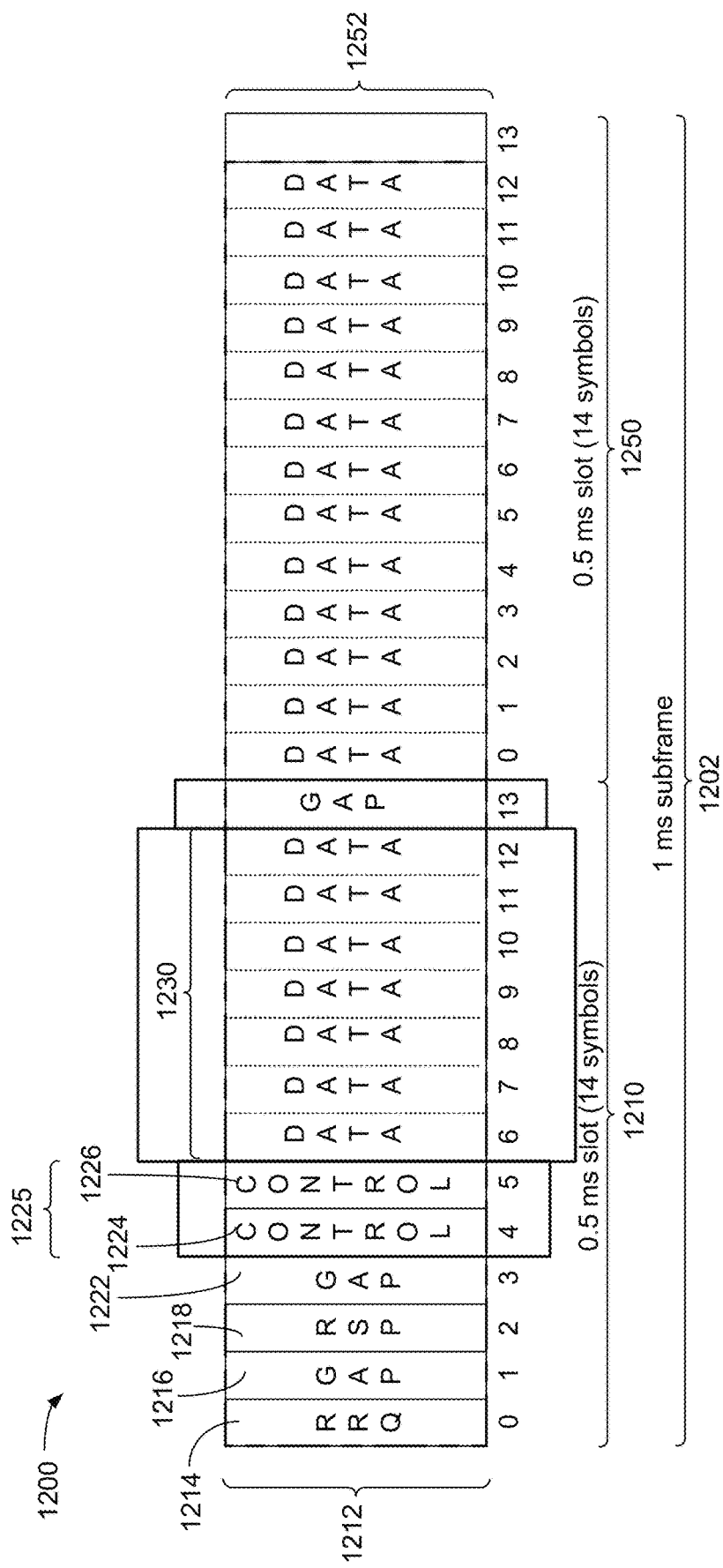
FIG. 12 is a diagram showing an exemplary communication subframe in accordance with various aspects of the present disclosure.

FIG. 12 is a diagram 1200 showing an exemplary communication subframe 1202 in accordance with various aspects of the present disclosure. In an exemplary embodiment, the subframe 1202 has a 30 KHz carrier spacing, as described above, and as such, the subframe 1202 comprises a 0.5 ms slot 1210 and a 0.5 ms slot 1250. In this exemplary embodiment, each slot 1210 and 1250 comprises 14 OFDM symbols (labeled 0-13 in each slot), and two slots 1210 and 1250 are shown. However, a communication may include other numbers of slots.

In an exemplary embodiment, the slot 1210 comprises OFDM symbols 1212 and the slot 1250 comprises OFDM symbols 1252. In the slot 1210, a first symbol 1214 (symbol 0) may comprise a request (RRQ) communication, a second symbol 1216 (symbol 1) may comprise a gap in communication, a third symbol 1218 (symbol 2) may comprise a response (RSP) communication, and a fourth symbol 1222 (symbol 3) may comprise a gap in communication. In an exemplary embodiment, the response (RSP) communication in the third symbol 1218 is a communication that is received from another transceiver that received the request (RRQ) communication (symbol 1214) from the subject transceiver to indicate that the other transceiver is interested in receiving the rest of the data in the slot 1210 from the subject transceiver. In an exemplary embodiment, the first symbol 1214 (symbol 0), that is, the RRQ communication, may be considered to create an exclusion zone around the transmitter that is transmitting this RRQ symbol in that other transmitters (i.e., transmitters in those other transceivers with non-high QoS communication) will back off communications when receiving this RRQ symbol from the subject transceiver. In an exemplary embodiment, the third symbol 1218 (symbol 3), that is, the RSP communication, may be considered to create an exclusion zone around a receiver that is receiving this RSP symbol, in that other transmitters will also back off communications when they receive this RSP symbol.

In an exemplary embodiment, the fifth symbol 1224 (symbol 4) and the sixth symbol 1226 (symbol 5) may comprise a control channel 1225, such as a PSCCH as described above. The seventh through thirteenth symbols (symbols 6 through 12) may be reserved for data 1230, such as the PSSCH described above), and the 14$^{th}$ symbol (symbol 13) may comprise a gap in communication.

In an exemplary embodiment, the first through 13$^{th}$ symbols (symbol 0 through symbol 12), in the slot 1250 may comprise a data communication (such as a PSSCH), and the 14$^{th}$ symbol (symbol 13) may comprise a gap in communication.

In an exemplary embodiment, a subject transmitter in a subject communication device will send the RRQ communication to initiate a communications packet, or session. Receivers in other communication devices that have received the RRQ communication from the subject transmitter will respond to the subject communication device with the RSP communication, and other transmitters (transmitters in other communication devices) with normal traffic (i.e. non-high QoS communications) will back off when they receive the RRQ communication from the subject transmitter. Stated differently, the RRQ communication creates an exclusion zone around the transmitter in the subject communication device. The subject transmitter will then start to transmit the control channel 1225 after receiving the RSP communication from another communication device that may be interested in receiving the complete control channel 1225. Other transmitters will also back off when they receive the RSP communication from the other communication device. Stated differently, the RSP communication creates an exclusion zone around the receiver in the subject transceiver.

In an exemplary embodiment, the control channel 1225 comprises information used for decoding the data channel 1230 and enables efficient use of communication resources.

In an exemplary embodiment, the control channel 1225 may comprise the modulation and coding rate information of the data channel 1230, the length of current transmission (in number of slots), and whether this transmission should be combined in a soft manner with other transmissions. Combining transmissions in a soft manner may be similar to HARQ combining in LTE. For example, two (2) coded versions of the same packet are transmitted at two different times. The receiver can then use the two versions combined to obtain a large coded version of the original packet to perform decoding. An advantage is lowering the coding rate (i.e., the coding gain increases), time and frequency diversity (i.e., one (1) coded version may be in deep fast fading, but the other coded version is not).

In an exemplary embodiment, the total payload, also referred to as control content, of the control channel 1225 is approximately 10-16 bits. Because of the importance of the information contained in the control channel 1225, it is desirable that the signal design of the control channel 1225 should allow as reliable as possible decoding performance at a receiver. For example, if the performance goal of the data channel 1230 is 10% packet loss at a certain signal-to-noise ratio (SNR) level, then the performance goal of the control channel 1225 should be <1% packet loss at the same SNR level. In an exemplary embodiment, the control channel 1225 communication in the symbols 1224 and 1226 may be designed for efficient communication, as will be described below.

Figure 13:
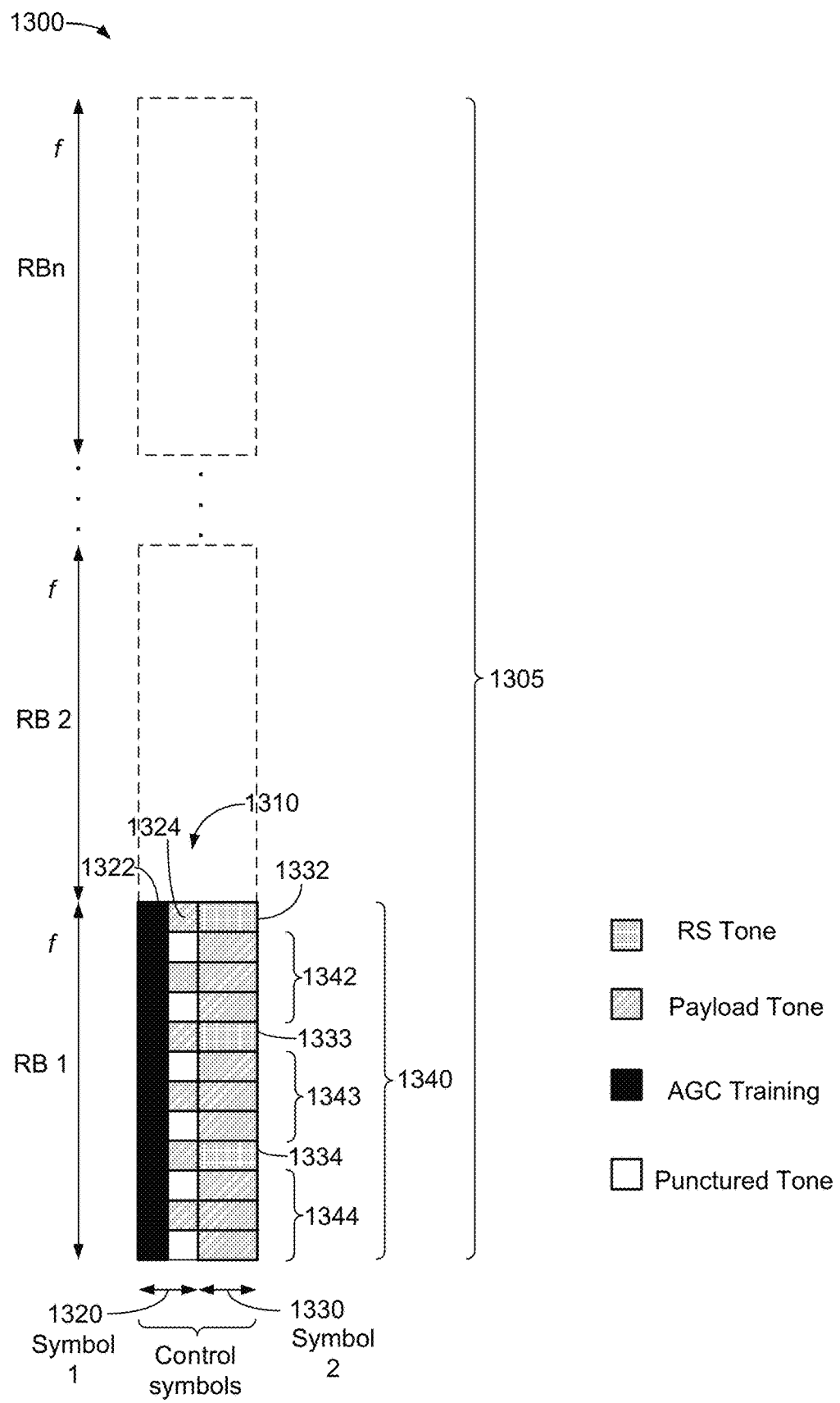
FIG. 13 is a diagram showing an exemplary embodiment of a control channel of FIG. 11 in accordance with various aspects of the present disclosure.

FIG. 13 is a diagram 1300 showing an exemplary embodiment of a control channel of FIG. 12 in accordance with various aspects of the present disclosure. In an exemplary embodiment, the control channel 1305 may comprise one or more resource blocks, with a resource block 1310 shown for illustrative purposes only. The control channel 1305 may comprise "n" resource blocks, where resource blocks two through n are shown in dotted line, as they would be identical to resource block 1310, but would occupy different frequencies, or frequency bins or tones.

In an exemplary embodiment, the resource block 1310 may comprise two symbols, 1320 and 1330, or stated differently, two symbol lengths in the time domain. In an exemplary embodiment, the symbol 1320 may be divided into half-symbols, where symbol 1320 comprises half-symbols 1322 and 1324. As shown for example in FIG. 13, the resource block 1310 includes twelve exemplary frequency carriers, or frequency bins 1340.

In an exemplary embodiment, the resource block 1310 comprises the first symbol 1320, where the first half-symbol 1322 is the preamble used for AGC (automatic gain control) training (or retraining) at a receiver. Accordingly, only one-half of the tones (in this example, odd tones) of the second half-symbol 1324 are usable for transmission of information. This is illustrated by the even tones in the second half-symbol 1324 being used for payload (control content) and the odd tones in the second half-symbol 1324 being unoccupied, which may also be referred to as the odd frequency bins or tones (in this example) being "punctured", or being "punctured tones." The odd tones in the second half-symbol 1324 may be unoccupied because they are unusable because the receiver is occupied while performing AGC training, such that the receiver will not receive and decode any information in those tones.

Conversely, all tones in the second symbol 1330 are usable. In an exemplary embodiment, the reference signal (RS tone) occupies the second symbol 1330 once every 4 tones, with the RS shown as occupying tones 1332, 1333 and 1334, with payload (payload tones comprising control content) occupying the rest of the tones in the second symbol 1330, shown as tones 1342, 1343 and 1344. In this example, the term "payload" refers to the balance of the control content information in the resource block 1310. The pattern is repeated for every resource block in the control channel 1305. In an exemplary embodiment, the smallest number of transmit resource blocks is five (5), so in this example, the resource blocks would number RB1 through RB5. In this exemplary embodiment, it is assumed that quadrature phase-shift keying (QPSK) modulation is used for the symbols 1320 and 1330 in the control channel 1305. In this example, the number of channel bits is (5×(6+12)−3)×2=150 bits. With an exemplary payload of 16 bits, and four (4) bits of CRC (cyclic redundancy check), the coding rate is 20/150=1/7.5.

Figure 14:
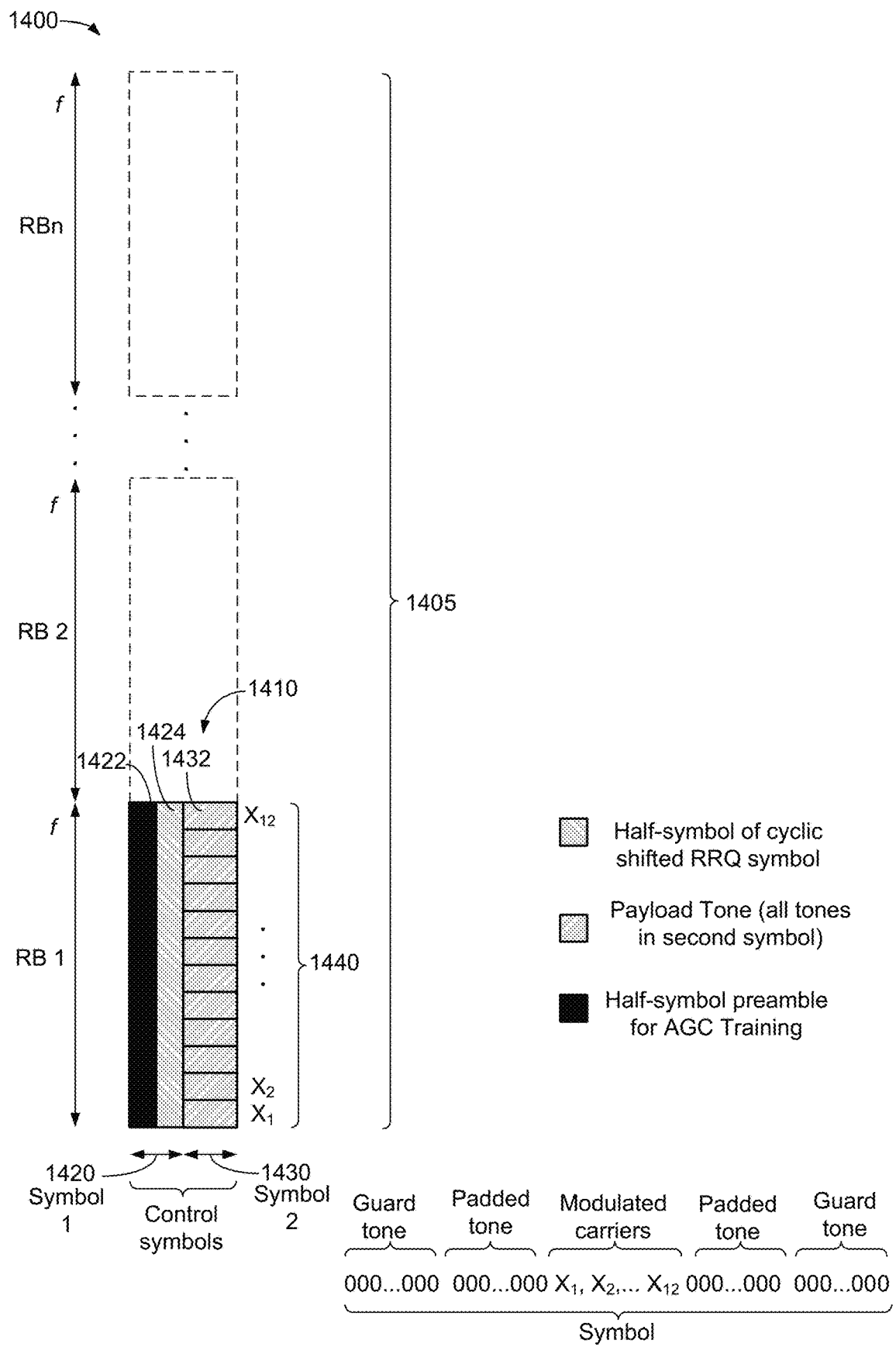
FIG. 14 is a diagram showing an exemplary embodiment of a control channel of FIG. 11 in accordance with various aspects of the present disclosure.

FIG. 14 is a diagram 1400 showing an exemplary embodiment of a control channel of FIG. 12 in accordance with various aspects of the present disclosure. In an exemplary embodiment, the control channel 1405 may comprise one or more resource blocks, with a resource block 1410 shown for illustrative purposes only. The control channel 1405 may comprise "n" resource blocks, where resource blocks two through n are shown in dotted line, as they would be identical to resource block 1410, but would occupy different frequencies, or frequency bins.

In an exemplary embodiment, the resource block 1410 may comprise two symbols, 1420 and 1430. In an exemplary embodiment, the symbol 1420 may be divided into half-symbols, where symbol 1420 comprises half-symbol 1422 and half-symbol 1424. As shown for example in FIG. 14, the resource block 1410 includes twelve exemplary frequency carriers, or frequency bins or tones 1440 with an exemplary frequency carrier, or frequency bin or tone shown using reference numeral 1432.

In an exemplary embodiment, when generating an exemplary OFDM symbol, in frequency, each tone may comprise a modulated carrier, and in this example each resource block (RB) may have 12 tones, or 12 modulated carriers. The modulated signal in tone i is $X_i$, so in this example, the modulated carriers would be referred to as modulated carriers $X_1$ through $X_{12}$. A sequence is a series of modulated tones $X_1, X_2, \ldots, X_{12NRB}$, with the "N" in NRB referring to the number of RBs. Zeros (Os) are padded (or added) to non-allocated tones and guard tones to obtain the full FFT size for a symbol. Generally, as used herein, a symbol refers to one (1) OFDM symbol, which may include a known sequence, modulated data, or a combination of a known sequence and modulated data. In an exemplary embodiment, the RRQ sequence may be a known sequence sent on the first symbol (1214, FIG. 12) in the slot 1210 (FIG. 12). In an exemplary embodiment, the term "sequence" may be used interchangeably with the term "symbol."

An exemplary full FFT may appear as "000 . . . 000 000 . . . 000 $x_1, x_2, \ldots, x_{12NRB}$ 000 . . . 000 000 . . . 000" where the first and last series of "000 . . . 000" may be guard tones and the second and second last series of "000 . . . 000" may be unused (padded) tones. For example, in an LTE 10 MHz system: NFFT=1024, there are 600 usable tones (50 resource blocks), 212 lower guard tones and 212 upper guard tones.

A fast Fourier transform (FFT) is applied to the padded sequence to obtain the signal in the time domain as follows: $x_1 \, x_2 \, x_{FFT-1} \, x_{FFT}$.

A cyclic prefix is then added as follows: $x_{FFT-CP} \, x_{FFT-CP+1} \ldots x_{FFT} \, x_1 \, x_2 \ldots x_{FFT-1} \, x_{FFT}$.

Half-Repeated Symbol

When the transmitted signal in the frequency domain has the form:

$x_1, 0, x_2, 0, \ldots, 0, x_{6NRB}$, then only one (1) tone per every two (2) tones is used to carry a modulated signal. This configuration is referred to as the symbol having "punctured tones" as mentioned above.

The signal generated in the time domain (excluding the cyclic prefix) comprises two (2) identical halves as follows:

$x_1 \, x_2 \ldots x_{FFT/2} \, x_1 \, x_2 \ldots x_{FFT/2}$.

If the first half of the symbol is used for AGC training, such as half-symbol 1422, the receiver only receives $0 \, 0 \ldots 0 \, x_1 \, x_2 \ldots x_{FFT/2}$.

The receiver can receive the second half of the symbol (half-symbol 1424 having a cyclic-shifted RRQ symbol) to make up for the first half that was used for AGC training and then recover the full symbol $x_1 \, x_2 \ldots x_{FFT/2} \, x_1 \, x_2 \ldots x_{FFT/2}$.

The receiver can apply an inverse fast Fourier transform (IFFT) to the second symbol half (half-symbol 1424) to recover the signal in the frequency domain, $x_1, 0, x_2, 0, \ldots, 0, x_{6NRB}$.

Cyclic Shift

A cyclic shift is a transformation of the time domain signal $x_1 \, x_2 \ldots x_{FFT} \rightarrow x_d \, x_{d+1} \ldots x_{FFT} \, x_1 \, x_2 \ldots x_{d-1}$. This example of the time domain signal is cyclic shifted by d samples.

When d=FFT*q, it is inferred that this is "q" times symbol cyclic shift.

$\frac{1}{8}^{th}$ symbol cyclic shift: d=FFT/8

$\frac{1}{4}^{th}$ symbol cyclic shift: d=FFT/4

$\frac{3}{8}^{th}$ symbol cyclic shift: d=3FFT/8.

When the time domain signal comprises two (2) identical halves, d sample shift and d+FFT/2 sample shift produce the same outcome in this example. In this example, the four (4) shifts would be 0, $\frac{1}{8}^{th}$, $\frac{2}{8}^{th}$ and $\frac{3}{8}^{th}$.

Frequency Domain Cover Code

Applying a cyclic shift is equivalent to applying a cover code in the frequency domain. For example, a $\frac{1}{4}^{th}$ symbol cyclic shift may correspond to a [1 j −1 −j] cover code: $X_1, X_2, \ldots, X_{12NRB} \rightarrow X_1, j*X_2, -X_2, -j*X_2 \ldots, -j*X_{12NRB}$.

In an exemplary embodiment, a $\frac{1}{8}^{th}$ symbol cyclic shift may correspond to $X_1, 0, X_2, 0, \ldots, 0, X_{6NRB} \rightarrow X_1 \, 0 \, j*X_2 \, 0 \, -X_3 \, 0 \, -j*X_4 \ldots 0 \, -j*X_{6NRB}$ for an even number NRB of resource blocks; and $X_1, 0, X_2, 0, \ldots, 0, X_{6NRB} \rightarrow X_1 \, 0 \, j*X_2 \, 0 \, -X_3 \, 0 \, -j*X_4 \ldots 0*X_{6NRB}$ for an odd number NRB of resource blocks.

The cover codes in this exemplary embodiment are:

0 shift→[1 1 1 1]

$\frac{1}{8}^{th}$ shift→[1 j −1 j]

$\frac{2}{8}^{th}$ shift→[1 −1 1 −1]

$\frac{3}{8}^{th}$ shift→[1 −j −1 j]

Of the information contained in the control channel 1405, the number of transmission slots that make up a particular transmission is particularly relevant to other communication devices to allow efficient sharing of communications resources. Another device, such as another UE, which may not be able to decode the control information and data (control content) in the control channel 1405, may still benefit from knowing the length of the transmission, for example, the number of slots in the transmission, so that it can back-off accordingly during that transmission.

In an exemplary embodiment, the control channel 1405 comprises the first symbol 1420, where the first half-symbol 1422 is the preamble used for AGC (automatic gain control) training (or retraining) at a receiver. In this exemplary embodiment, the second half-symbol 1424 of the first symbol 1420 is a copy of the request (RRQ) sequence 1214 (FIG. 12). In an exemplary embodiment, the copy of the request (RRQ) sequence 1214 (FIG. 12) in the second half-symbol 1424 may be cyclic shifted by zero or by ⅛ fractions of symbols as described above. In an exemplary embodiment where the maximum number of slots in the transmission is four (4), and the RRQ sequence occupies one (1) symbol, if the RRQ sequence is not cyclic shifted and transmitted in the second half-symbol 1424, it corresponds to a control channel of a transmission having a total of one (1) slot, if the RRQ sequence is shifted by one (1) eighth symbol and transmitted in the second half-symbol 1424, it corresponds to a control channel of a transmission having a total of two (2) slots, if the RRQ sequence is shifted by one-quarter (⅖) of a symbol and transmitted in the second half-symbol 1424, it corresponds to a control channel of a transmission having a total of three (3) slots, and if the RRQ sequence is shifted by three (3) eights of a symbol and transmitted in the second half-symbol 1424, it corresponds to a control channel of a transmission having a total of four (4) slots. In this manner, the copy of the RRQ symbol and the cyclic shift applied to the second half-symbol 1424 of the first symbol 1420 indicates the length of the transmission in slots, thereby allowing another communication device to know the length of the transmission, so that it can back-off accordingly during that transmission.

In an exemplary embodiment, the RRQ communication is a sequence of complex numbers transmitted on the first symbol (1214 in FIG. 12), so that an RRQ communication refers to the first symbol of a communication frame, while the RRQ sequence is the actual sequence of complex numbers being transmitted in that symbol (the first symbol 1214 (FIG. 12) in this example).

In an exemplary embodiment, this approach can be applied to any number of slots "N" other than 4, as long as the minimum cyclic shift (½*N symbols due to the ½ symbol repetition) remains larger than the maximum delay of the channel. For example, signals may arrive at a receiver at different times due to, for example, blocking, reflection, diffusion, etc. Some signals arrive first (at a first tap), and some arrive later. A "tap" is a time location where the receiver receives a signal strength peak. A channel has many "taps", i.e., a receiver will receive many such energy peaks at different times. When a cyclic shift is used, those "peaks" are delayed in time by exactly the shift amount (i.e., if a $⅛^{th}$ symbol cyclic shift is used, then those peaks will be delayed by 4 us, assuming that one (1) symbol is 32 us long). The channel delay is the time difference between a first peak (or tap) of the channel and the last peak (or tap). Therefore, the cyclic shift should be larger than the channel delay, so that when a signal peak is received by the receiver, the receiver can determine that this is the first signal peak of the channel of a shifted sequence (or symbol), not the last signal peak of the channel of the non-shifted sequence (or symbol). The minimum cyclic shift should exceed the maximum channel delay (e.g. last tap of a channel). In an exemplary embodiment, the copy of the RRQ sequence in the second half-symbol 1424 is used as the reference signal to decode the control channel, which is delivered in the second symbol 1430.

In an exemplary embodiment, detecting the number of slots can be thought of as detecting a cyclic shift. Given that the initial channel frequency offset estimation and timing offset estimation has been done in the initial RRQ detection phase, in this control channel phase the timing offset detection can by quite efficiently solved by performing correlation with the RRQ sequence to obtain the channel response in the time domain. Then, the peak channel response between 4 reference points can be determined: $1^{st}$ tap, $1^{st}$ tap+eighth symbols, $1^{st}$ tap+quarter symbols and $1^{st}$ tap+3 eighth symbols. The performance is expected to be good at around −15 dB SNR.

In an exemplary embodiment, a UE other than the UE transmitting the RSP sequence, can detect the cyclic shifted RRQ sequence being transmitted in the reference signal of the control channel (i.e. the first symbol of the control channel) and compare it with the original transmitted RRQ sequence (1214 in FIG. 12) to determine the length of the transmission, so it can back-off accordingly during the transmission.

In an exemplary embodiment, the coding rate of the control channel will increase by 9/8, from 1/7.5 to 1.5/10. As those are quite low coding rates, the operating SNR difference will be exactly the coding rate difference, i.e. 10*log 10(9/8) approx. 0.5 dB. This may be considered a reasonable tradeoff, given that control channel performance is already quite robust, particularly when compared to the performance of the data channel.

Figure 15:
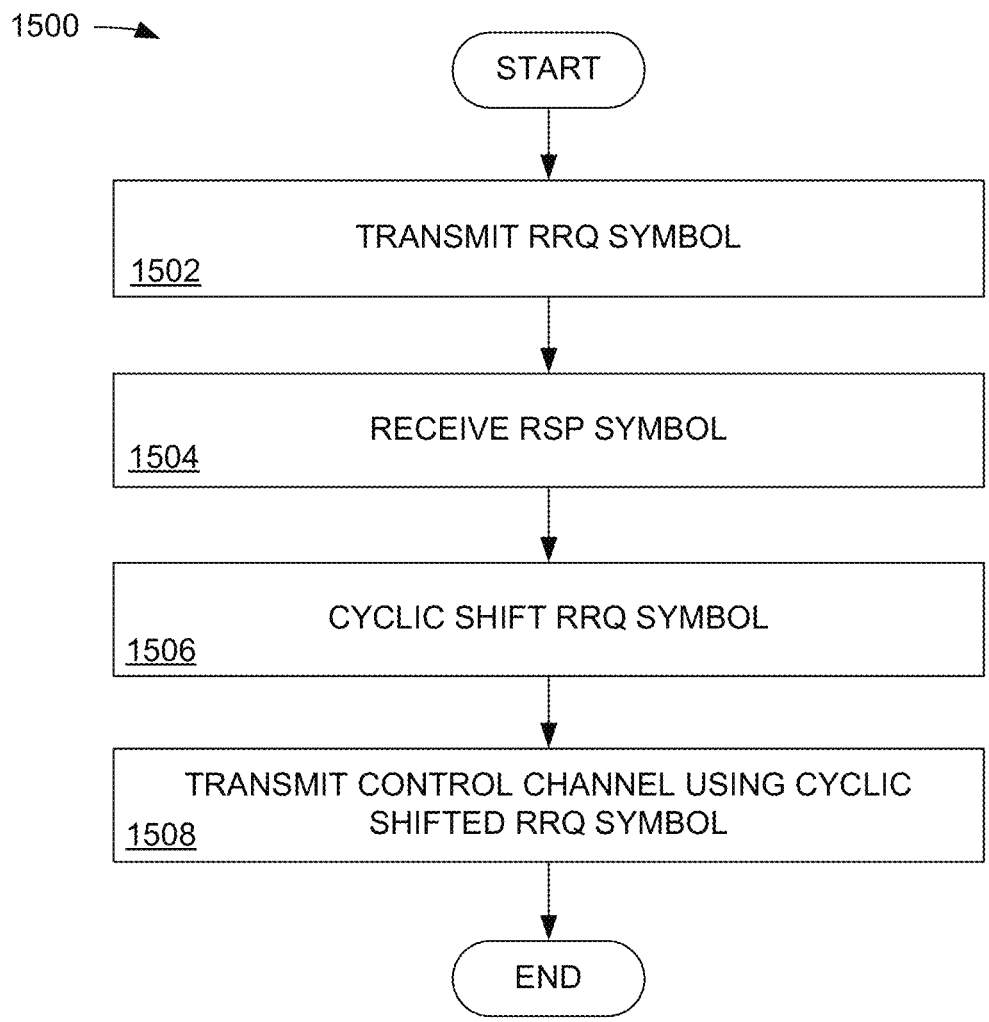
FIG. 15 is a flow chart illustrating an example of a method for communication, in accordance with various aspects of the present disclosure.

FIG. 15 is a flow chart illustrating an example of a method for communication, in accordance with various aspects of the present disclosure. The blocks in the method 1500 can be performed in or out of the order shown, and in some embodiments, can be performed at least in part in parallel.

In block 1502, a request (RRQ) symbol is transmitted by a communication device. For example, a subject communication device, such as a UE 650, may transmit the RRQ symbol.

In block 1504, a response (RSP) symbol is received by the communication device. For example, a subject communication device, such as a UE 650, may receive the RRQ symbol from another communication device.

In block 1506, a request (RRQ) symbol is shifted by, for example, between zero and three-eighths of one symbol. For example, in an exemplary embodiment, the half-symbol 1424 of the first symbol 1420 is a copy of the request (RRQ) symbol 1214 (FIG. 12) and may be cyclic shifted by between zero and three-eighths of one symbol by a UE 650.

In block 1508, a control channel having the cyclic shifted RRQ symbol is transmitted. For example, a UE 650 may transmit the control channel having the cyclic shifted RRQ symbol.

Figure 16:
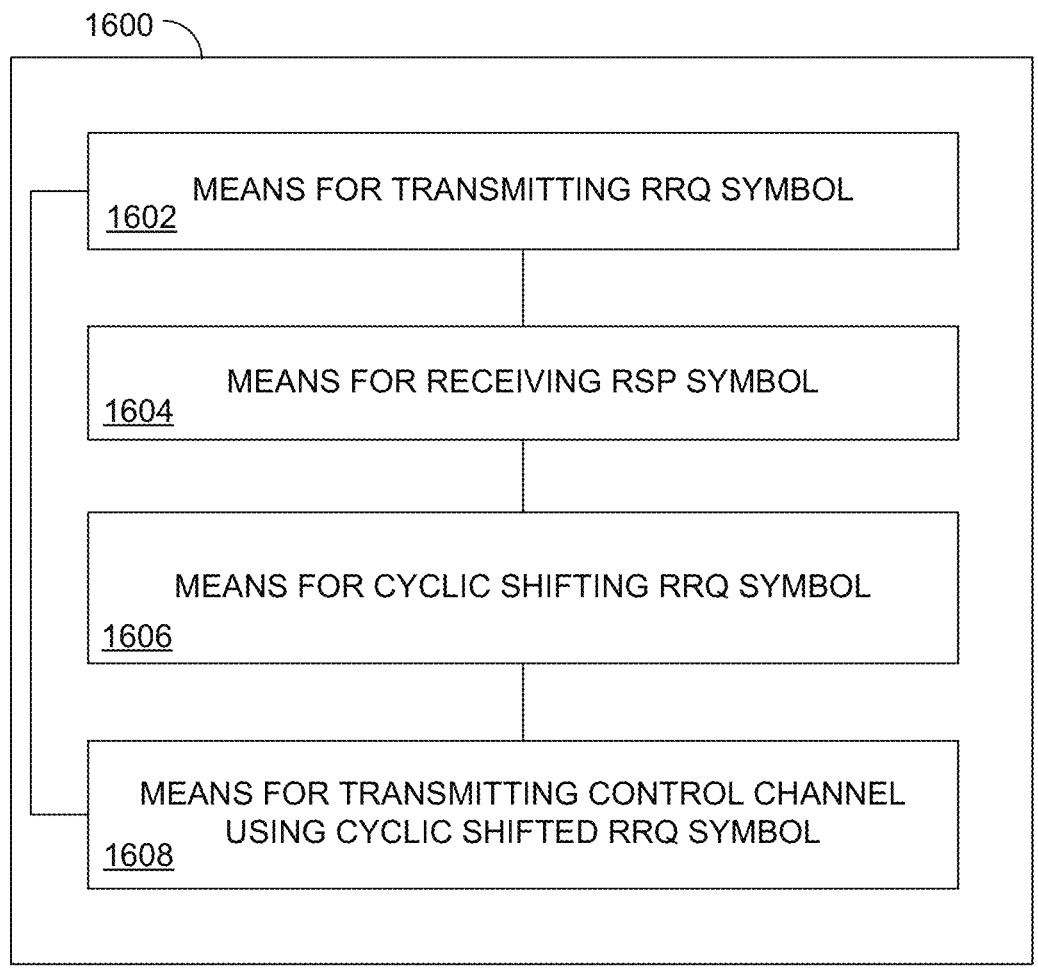
FIG. 16 is a functional block diagram of an apparatus for a communication system in accordance with various aspects of the present disclosure.

FIG. 16 is a functional block diagram of an apparatus 1600 for a communication system in accordance with various aspects of the present disclosure. The apparatus 1600 comprises means for transmitting a request (RRQ) symbol. In certain embodiments, the means 1602 for transmitting a request (RRQ) symbol can be configured to perform one or more of the function described in operation block 1502 of method 1500 (FIG. 15). In an exemplary embodiment, the means 1602 for transmitting a request (RRQ) symbol may comprise a UE transmitting the RRQ symbol.

The apparatus 1600 further comprises means 1604 for receiving a response (RSP) symbol. In certain embodiments, the means 1604 for receiving a response (RSP) symbol can be configured to perform one or more of the function described in operation block 1504 of method 1500 (FIG. 15). In an exemplary embodiment, the means 1604 for receiving a response (RSP) symbol may comprise a UE receiving the RSP symbol.

The apparatus 1600 comprises means 1606 for cyclic shifting a request (RRQ) symbol by, for example, between zero and three-eighths of one symbol. In certain embodiments, the means 1606 for cyclic shifting a request (RRQ) symbol can be configured to perform one or more of the function described in operation block 1506 of method 1500 (FIG. 15). In an exemplary embodiment, the means 1606 for cyclic shifting a request (RRQ) symbol may comprise a UE cyclic shifting the half-symbol 1424 of the first symbol 1420 by, for example, between zero and three-eighths of one symbol. The half-symbol 1424 of the first symbol 1420 may be a copy of the request (RRQ) sequence 1214 (FIG. 12).

The apparatus 1600 further comprises means 1608 for transmitting the control channel having the cyclic shifted RRQ symbol. In certain embodiments, the means 1608 for transmitting the control channel having the cyclic shifted RRQ symbol can be configured to perform one or more of the function described in operation block 1508 of method 1500 (FIG. 15). In an exemplary embodiment, the means 1608 for transmitting the control channel having the cyclic shifted RRQ symbol may comprise a UE transmitting the control channel having the cyclic shifted RRQ symbol.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
   generating a control channel comprising a first symbol and a second symbol, the first symbol comprising a first symbol half and a second symbol half, the first symbol half of the first symbol comprising information relating to automatic gain control (AGC) training;
   the second symbol half of the first symbol comprising a cyclic shifted copy of a request symbol corresponding to a length of a transmission; and
   the second symbol comprising control content.
2. The method of claim 1, further comprising:
   cyclic shifting the copy of the request symbol by at least one-eighth of one communication symbol.
3. The method of claim 1, further comprising:
   cyclic shifting the copy of the request symbol by between zero and three-eighths of one communication symbol.
4. The method of claim 1, further comprising:
   using the cyclic shifted copy of the request symbol as a reference signal to decode the control content.
5. The method of claim 1, wherein the cyclic shifted copy of the request symbol conveys information related to a number of transmission slots in a communication.
6. A wireless communication apparatus having a processor configured to generate a control channel for communication, comprising:
   a control channel comprising a first symbol and a second symbol, the first symbol comprising a first symbol half and a second symbol half;
   the first symbol half of the first symbol comprising information relating to automatic gain control (AGC) training;
   the second symbol half of the first symbol comprising a cyclic-shifted copy of a request symbol corresponding to a length of a transmission; and
   the second symbol comprising control content.
7. The apparatus of claim 6, wherein the cyclic shifted copy of the request symbol is cyclic shifted by at least one-eighth of one communication symbol.
8. The apparatus of claim 6, wherein the cyclic shifted copy of the request symbol is cyclic shifted by between zero and three-eighths of one communication symbol.
9. The apparatus of claim 6, wherein the cyclic shifted copy of the request symbol is used as reference signal to decode the control content.
10. The apparatus of claim 6, wherein the cyclic shifted copy of the request symbol conveys information related to the number of transmission slots in a communication.
11. A device, comprising:
    means for transmitting a request (RRQ) symbol;
    means for receiving a response (RSP) symbol in response to the RRQ symbol;
    means for cyclic shifting a portion of a control channel, the cyclic shifted portion of the control channel comprising a copy of the request symbol corresponding to a length of a transmission; and
    means for transmitting the control channel including the cyclic shifted copy of the request symbol.
12. The device of claim 11, further comprising:
    means for cyclic shifting the copy of the request symbol by at least one-eighth of one communication symbol.
13. The device of claim 11, further comprising:
    means for cyclic shifting the copy of the request symbol by between zero and three-eighths of one communication symbol.
14. The device of claim 11, further comprising:
    means for using the cyclic shifted copy of the request symbol as a reference signal to decode the control content.
15. The device of claim 11, wherein the cyclic shifted copy of the request symbol conveys information related to the number of transmission slots in a communication.
16. A non-transitory computer-readable medium storing computer executable code for communication, the code executable by a processor to:
    generate a control channel comprising a first symbol and a second symbol, the first symbol comprising a first symbol half and a second symbol half;
    the first symbol half of the first symbol comprising information relating to automatic gain control (AGC) training;
    the second symbol half of the first symbol comprising a cyclic shifted copy of a request symbol corresponding to a length of a transmission; and
    the second symbol comprising control content.

17. The non-transitory computer-readable medium of claim 16, the code executable by a processor to:
   cyclic shift the copy of the request symbol by at least one-eighth of one communication symbol.

18. The non-transitory computer-readable medium of claim 16, wherein the code is executable by a processor to:
   cyclic shift the copy of the request symbol by between zero and three-eighths of one communication symbol.

19. The non-transitory computer-readable medium of claim 17, wherein the code is executable by a processor to:
   use the cyclic shifted copy of the request symbol as a reference signal to decode the control content.

20. The non-transitory computer-readable medium of claim 16, wherein the code is executable by a processor to:
   allow the cyclic shifted copy of the request symbol to convey information related to the number of transmission slots in a communication.

\* \* \* \* \*